(12) United States Patent
Lopresti et al.

(10) Patent No.: US 6,324,077 B1
(45) Date of Patent: Nov. 27, 2001

(54) SWITCH MODE POWER SUPPLY (75) Inventors: Angelo Lopresti, Lodi; Francis D. Batcheler, Flemington, both of NJ (US)

(73) Assignee: Martek Power, Inc., Hackensack, NJ (US)

( * ) Notice: Subject to any disclaimer, the term of this patent is extended or adjusted under 35 U.S.C. 154(b) by 0 days.

(21) Appl. No.: 09/838,099

(22) Filed: Apr. 19, 2001

(51) Int. Cl.[7] .................................................. H02M 3/335
(52) U.S. Cl. ...................... 363/16; 363/21.06; 363/21.1; 363/21.14; 363/21.18; 363/24
(58) Field of Search ................................... 363/16, 21.01, 363/21.06, 21.1, 21.14, 21.18, 89, 97, 127, 131, 24, 25, 26, 133

(56) References Cited

U.S. PATENT DOCUMENTS

| | | | |
|---|---|---|---|
| 4,870,555 | 9/1989 | White | 363/21.06 |
| 5,519,599 | 5/1996 | Shinada et al. | 363/21.06 |
| 5,708,571 | 1/1998 | Shinada | 363/21.06 |
| 5,726,869 | 3/1998 | Yamashita et al. | 363/21.04 |
| 5,742,491 | 4/1998 | Bowman et al. | 363/21.06 |
| 5,781,420 | 7/1998 | Xia et al. | 363/21.06 |
| 5,862,043 | 1/1999 | Youn et al. | 363/21.06 |
| 5,999,420 | 12/1999 | Aonuma et al. | 363/16 |
| 6,061,255 | 5/2000 | Chik et al. | 363/21.06 |
| 6,069,802 | 5/2000 | Priegnitz | 363/21.06 |
| 6,069,804 * | 5/2000 | Ingman | 363/21.14 |

* cited by examiner

*Primary Examiner*—Jessica Han
(74) *Attorney, Agent, or Firm*—Richard M. Goldberg (57) ABSTRACT

A power supply circuit includes an input stage having a primary winding of a transformer, a drive pulse circuit producing clock and drive pulses, and an input control circuit for driving the primary winding with the drive pulse; and an output stage including a secondary winding, a first transistor having an input, and an output path connected with one end of the secondary winding; a second transistor having an input, and an output path connected with another end of the secondary winding; the first and second transistors being connected with the drive pulse circuit and the second transistor controlled to turn off by the clock pulse immediately before the first transistor turns on; an inductor connected to the output paths of one of the first and second transistors; and a capacitive circuit connected to the inductor.

18 Claims, 10 Drawing Sheets

CLOCK
PULSE    0

FIG. 3B

EAOUT    0

FIG. 3C

SAWTOOTH    0

FIG. 3D

DRIVE
PULSE    0

FIG. 3E

CLOCK
DRIVEN
SYNC
PULSE    0

SWITCH MODE POWER SUPPLY

BACKGROUND OF THE INVENTION

The present invention relates generally to power supplies, and more particularly, is directed to a more efficient switch mode power supply.

Linear power supplies have conventionally been provided for various circuits. However, such linear power supplies are generally not very efficient, and are also relatively large. For this reason, switch mode power supplies are preferred in many instances, due to the fact that they dissipate much less heat and require less cooling than linear power supplies, because they are much more efficient. Further, switch mode power supplies require less surface area for cooling than linear power supplies, thereby reducing the size. However, the efficiency of such switch mode power supplies is still not entirely satisfactory, and there is much wasted energy.

Conventionally, such switch mode power supplies have used passive diodes. A primary winding at the input and a secondary winding at the output are provided, along with passive diodes in the output circuit following the secondary winding. Specifically, such a power supply includes a primary winding and a secondary winding, with the primary winding being driven through a circuit of MOSFETs and diodes, by means of drive pulses which are pulse width modulated (PWM) pulses. From the secondary winding, the output is derived through passive diodes and a choke coil. The problem with this circuit is that there is a large forward voltage drop across the passive diodes at the output, which dissipates much power, making the power supply inefficient. Examples of such circuits are disclosed in U.S. Pat. Nos. 5,781,420 and 6,061,255.

For this reason, it is known to replace the passive diodes at the output of the secondary winding with actively controlled switches, such as MOSFETs, which can be turned on and off with a voltage control signal. The forward voltage drop across the MOSFETs is much smaller than that across the passive diodes, so as to dissipate less power and thereby greatly increase the power efficiency of the circuit. The actively controlled switches are commonly referred to as "synchronous rectifiers."

The actively controlled switches only permit current flow when they are activated. Thus, the activating signals must have the correct timing relationship to other activities in the circuit for maximum efficiency, that is, the actively controlled switches must be synchronized with other circuit elements.

However, with such known circuits, the circuitry for turning the MOSFETs on and off at the output of the secondary winding is very complicated and not entirely accurate. Specifically, the signals supplied to the inputs of the MOSFETs for turning them on and off are derived from the output of the secondary winding. In order to do this, it is necessary to use delay circuits, and this is not an easy task. Specifically, the delay circuits are provided since it is necessary to turn off one MOSFET before the other MOSFET turns on. It is very difficult, however, to control the delay times with the delay circuits.

Also, the delay times are dependent upon frequency changes. Therefore, if there is a frequency change in the system, all delay times must be changed. Further, if there is a frequency variation in the circuit, all of the timings will be off, which could render the circuit inoperable.

An example of such a circuit is shown in U.S. Pat. No. 5,726,869. In this circuit, the output from pulse width modulator (PWM) 5 is used to turn off FET Q5 at the same time that FET Q1 turns off. However, it is required, for the circuit to be operative, that FET Q1 must turn on after FET Q5 turns off. Accordingly, this circuit must use an inherent delay which is insufficient. Specifically, assuming a sawtooth waveform, this circuit turns the FETs on and off at the lower level of the waveform, which is used to control the PWM signal. However, a delay circuit is needed to accomplish this result. The same applies to the circuit of U.S. Pat. No. 4,870,555, which requires the use of gate delays to turn off one FET before the other FET is turned on. See also U.S. Pat. No. 6,069,802 which provides an inherent time delay circuit.

U.S. Pat. No. 5,999,420 is another example that uses time delays, and specifically provides a time delay circuit 8 for this purpose. The same applies with the delay circuits 113–115 of U.S. Pat. No. 5,742,491. Other circuits of interest are disclosed in U.S. Pat. Nos. 5,519,599; 5,708,571; 5,862,043; 5,781,420; and 6,061,255, each of which controls the FETs by an output from the secondary winding, and each of which therefore requires circuitry that provides a time delay.

OBJECTS AND SUMMARY OF THE INVENTION

Accordingly, it is an object of the present invention to provide a switch mode power supply that overcomes the problems with the aforementioned prior art.

It is another object of the present invention to provide a switch mode power supply that accurately controls turning on and off of the FETs at the output stage.

It is still another object of the present invention to provide such a switch mode power supply in which the FETs are controlled so that each switches off immediately before the other switches on so as to provide negligible off time of the circuit.

It is yet another object of the present invention to provide a switch mode power supply that does not require any complicated drive circuitry including delay circuits.

It is a further object of the present invention to provide a switch mode power supply which can be used over a wide frequency range without modification.

It is a still further object of the present invention to provide a switch mode power supply in which there is minimal power loss due to the use of FETs in place of diodes.

It is a yet further object of the present invention to provide a switch mode power supply which is easy and economical to use and make.

In accordance with an aspect of the present invention, a power supply circuit includes an input stage having a primary winding of a transformer, a drive pulse circuit for producing a clock pulse and a drive pulse, and an input control circuit connected between the drive pulse circuit and the primary winding for driving the primary winding in accordance with the drive pulse. There is also an output stage including a secondary winding of the transformer in close proximity to the primary winding, a first transistor having an input, and an output path connected with one end of the secondary winding; and a second transistor having an input, and an output path connected with another end of the secondary winding. At least one of the first and second transistors being connected with the drive pulse circuit and controlled to turn off by the clock pulse from the drive pulse circuit immediately before the other one of the transistors is turned on. The output path also includes an inductor having one end connected to the output path of one of the first and second transistors, and a capacitive circuit connected to an opposite end of the inductor.

Preferably, the transistors are field effect transistors. Also, a load is connected in parallel with the capacitive circuit. A diode is also connected across the output path of each of the transistors.

The drive pulse is applied to the input of the first transistor for turning the first transistor on and off, the drive pulse is applied to the input of the second transistor for turning the second transistor on, and the clock pulse is applied to the input of the second transistor for turning the second transistor off.

In one embodiment, the output path of the first transistor is connected between the one end of the secondary winding and the one end of the inductor, and the output path of the second transistor is connected between the other end of the secondary winding and the one end of the inductor.

In another embodiment, the output path of the first transistor is connected between the one end of the secondary winding and the capacitive circuit, the input of the first transistor is connected through a resistive circuit to the one end of the secondary winding, the output path of the second transistor is connected between the other end of the secondary winding and the capacitive circuit, the input of the second transistor is connected through a unidirectional circuit to the one end of the secondary winding, and a switch circuit is connected to the input of the second transistor to turn the second transistor off in response to the clock signal immediately before the first transistor turns on. In this second embodiment, the switch circuit includes a third transistor having an output path connected between the output path of the first transistor and the input of the second transistor, and an input supplied with the clock signal from the drive pulse circuit.

In a third embodiment, the output path of the first transistor is connected between the one end of the secondary winding and the one end of the inductor, the second transistor is connected between the other end of the secondary winding and the one end of the inductor, and the capacitive circuit is connected between the other end of the inductor and a tap of the secondary winding.

In accordance with another aspect of the present invention, a power supply circuit includes an input stage having a primary winding of a transformer, a drive pulse circuit for producing a clock pulse and a drive pulse, and an input control circuit connected between the drive pulse circuit and the primary winding for driving the primary winding in accordance with the drive pulse. There is also an output stage including a secondary winding of the transformer in close proximity to the primary winding, a first transistor having an input connected with the drive pulse circuit and supplied with the drive pulse for turning the first transistor on and off, and an output path connected with one end of the secondary winding; and a second transistor having an input connected with the drive pulse circuit and supplied with the clock signal for turning off the second transistor immediately before the first transistor is turned on, and an output path connected with another end of the secondary winding and with the output path of the first transistor. An inductor has one end connected to the output paths of the first and second transistors, and a capacitive circuit is connected between an opposite end of the inductor and the another end of the secondary winding.

In accordance with still another aspect of the present invention, a power supply circuit includes an input stage having a primary winding of a transformer, a drive pulse circuit for producing a clock pulse and a drive pulse, and an input control circuit connected between the drive pulse circuit and the primary winding for driving the primary winding in accordance with the drive pulse. There is also an output stage including a secondary winding of the transformer in close proximity to the primary winding, a first transistor having an input connected with one end of the secondary winding, and an output path connected with the one end of the secondary winding; and a second transistor having an input connected with the one end of the secondary winding through a unidirectional device, and an output path connected between the other end of the secondary winding and the output path of the first transistor. A third transistor has an output path connected between the input of the second transistor and the output path of the first transistor, and an input supplied with the clock signal from the drive pulse circuit to turn the second transistor off immediately before the first transistor turns on. Further, an inductor has one end connected to the other end of the secondary winding; and a capacitive circuit connected between an opposite end of the inductor and the output path of the first transistor.

The above and other objects, features and advantages of the invention will become readily apparent from the following detailed description thereof which is to be read in connection with the accompanying drawings.

DETAILED DESCRIPTION

Figure 1:
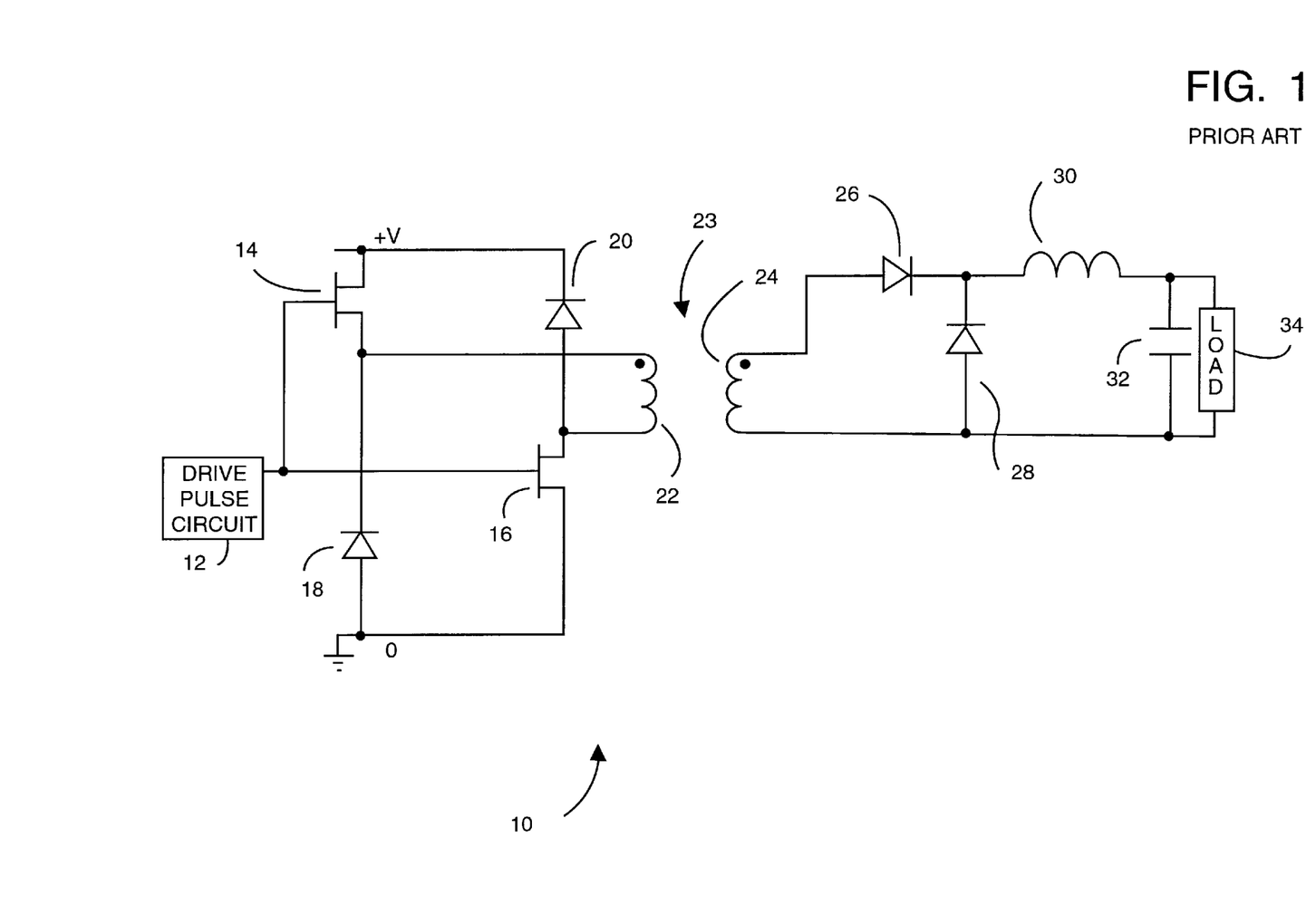
FIG. 1 is a circuit wiring diagram of a known power supply circuit of the switch mode type.

Referring to the drawings in detail, and initially to FIG. 1, there is a shown a known power supply circuit 10 of the switch mode type according to the prior art. Specifically, at the input side, drive pulses, and more particularly, pulse width modulated (PWM) pulses are supplied from a drive pulse circuit 12 to the gate inputs of MOSFETs 14 and 16. MOSFET 14 has its output circuit connected in series with a first input diode 18, and more particularly, is connected with the cathode of diode 18, with the series circuit of diode 18 and the output circuit of MOSFET 14 connected between a positive voltage +V and ground, and the anode of diode 18 connected to ground. The output circuit of MOSFET 16 is connected in series with a second input diode 20, and more particularly, to the anode thereof, with this series circuit also connected between positive voltage +V and ground, and the cathode of diode 20 connected to positive voltage +V. One end of a primary winding 22 of a transformer 23 is connected to the junction of MOSFET 14 with diode 18, and the other end of primary winding 22 is connected to the junction of MOSFET 16 and diode 20.

At the output side, a secondary winding 24 of transformer 23 is positioned in close proximity to primary winding 22 and is driven thereby. One end of secondary winding 24 is connected to the anode of a first output diode 26 and the other end of secondary winding 24 is connected to the anode of a second output diode 28, with the cathodes of first and second output diodes 26 and 28 being connected together and also being connected to one end of a choke coil or inductor 30. The opposite end of choke coil 30 is connected to one end of a capacitor 32, and the anode of second output diode 28 is connected to the other end of capacitor 32. A load 34 is placed in parallel connection with capacitor 32. However, as discussed above, the problem with this circuit is that there is a large forward voltage drop across the passive output diodes 26 and 28, which dissipates much power, making the power supply inefficient.

Figure 2A:
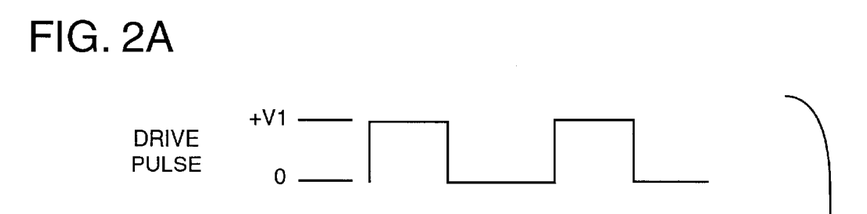
FIGS. 2A–2E are waveform diagrams of signals at different locations of the power supply circuit of FIG. 1.
Figure 2B:
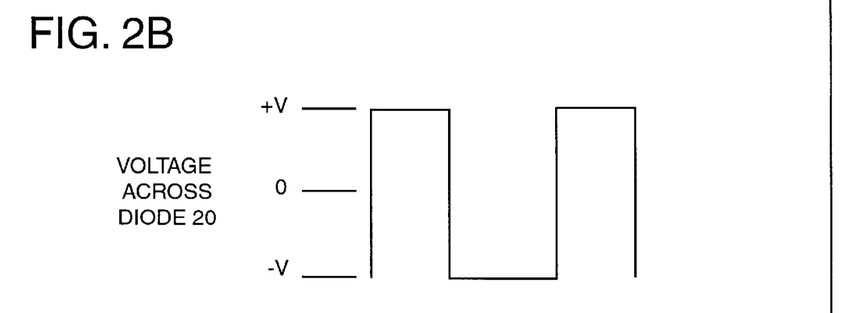

Referring now to FIGS. 2A–2E, it is common to apply a series of square wave voltage signals to the gates of MOSFETs 14 and 16 from drive pulse circuit 12. Specifically, as shown in FIG. 2A, the voltage steps up from 0 volts to +V1 volts at time t1, and then drops back down to 0 volts at time t2, repeating periodically, as shown at times t3 and t4. It is not necessary that the duty cycle be 50%, and in fact, as shown, the duty cycle is less than 50% in FIG. 2A. The voltage +V1 is sufficient to turn MOSFET 14 and MOSFET 16 from an open state to a closed state, resulting in +V volts being applied across primary winding 22 of transformer 23. This assumes that the voltage drops across MOSFETs 14 and 16 are negligible compared to the voltage +V when activated.

Figure 2C:
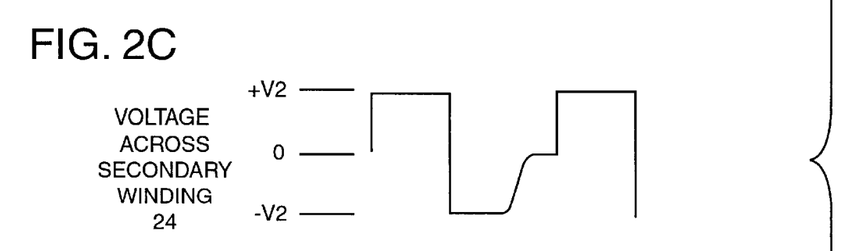
Figure 2D:
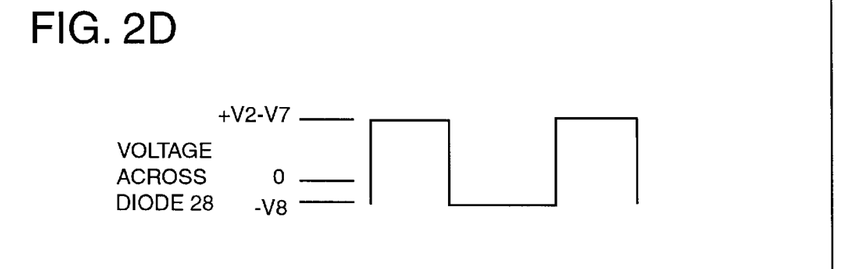
Figure 2E:
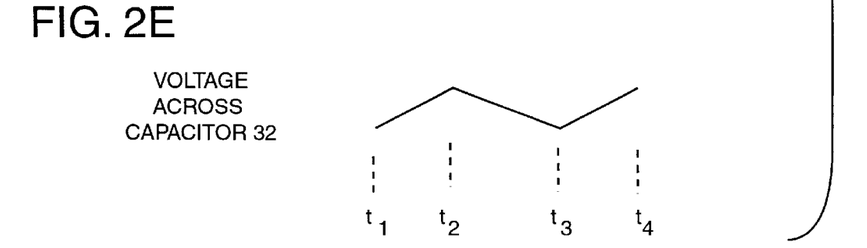

The voltage on primary winding 22 of transformer 23 results in a voltage +V2 being applied across secondary winding 24 of transformer 23, as shown in FIG. 2C, the value of the voltage +V2 being determined by the voltage +V and the parameters of transformer 23. Diode 26 turns on when a voltage of +V1 volts appears on the anode thereof. Accordingly, a voltage of +V2−V7 volts appears across diode 28, as shown in FIG. 2D, in which diode 28 is reverse biased. The voltage V7 is the forward voltage drop across diode 26 when it is conducting. The voltage across diode 28 is normally greater than the voltage across capacitor 32, resulting in a rising current through inductor 30. Consequently, there is a rising voltage across capacitor 32, as shown in FIG. 2E, from times t1 to t2 and times t3 to t4.

When the drive pulse falls to zero volts at time t2, the voltage across primary winding 22 of transformer 23 and the voltage across secondary winding 24 of transformer 23 reverses. This causes the voltage on the anode of diode 26 to fall, whereby conduction through diode 26 ceases. As a result, the current through inductor 30 forces the cathode of diode 28 to a negative voltage so that current can continue to flow therethrough. The output current now flows through diode 28, whereby there is a voltage drop V8 across diode 28.

However, as discussed above, the voltage drops V7 and V8 result in significant power losses. This reduction in voltage across diode 28 results in the voltage on the cathode of diode 28 being lower than the voltage across capacitor 32, so the current through inductor 30 falls as does the voltage across capacitor 32. This fall takes place from time t2 to time t3, as shown in FIG. 2E. Because of the large forward voltage drop across diodes 26 and 28, there is much dissipation of power, making the power supply inefficient.

For this reason, it is known to replace passive diodes 26 and 28 at the output of secondary winding 24 of transformer 23 with actively controlled switches, such as MOSFETs, which can be turned on and off with a voltage control signal. The forward voltage drop across the MOSFETs is much smaller than that across passive diodes 26 and 28, so as to dissipate less power and thereby greatly increase the power efficiency of the circuit. The actively controlled switches are commonly referred to as "synchronous rectifiers."

The actively controlled switches only permit current flow when they are activated. Thus, the activating signals must have the correct timing relationship to other activities in the circuit for maximum efficiency, that is, the actively controlled switches must be synchronized with other circuit elements.

However, as discussed above, with such known circuits, the circuitry for turning the MOSFETs on and off at the output of secondary winding 24 is very complicated and not entirely accurate. Specifically, the signals supplied to the inputs of the MOSFETs for turning them on and off are derived from the output of secondary winding 24. In order to do this, it is necessary to use delay circuits, and this is not an easy task. Specifically, the delay circuits are provided since it is necessary to turn off one MOSFET before the other MOSFET turns on, and this is the reason for requiring an external timing circuit. It is very difficult, however, to control the delay times with the delay circuits.

Also, the delay times are dependent upon frequency changes. Therefore, if there is a frequency change in the system, all delay times must be changed. Further, if there is a frequency variation in the circuit, all of the timings will be off, which could render the circuit inoperable.

Figure 3A:
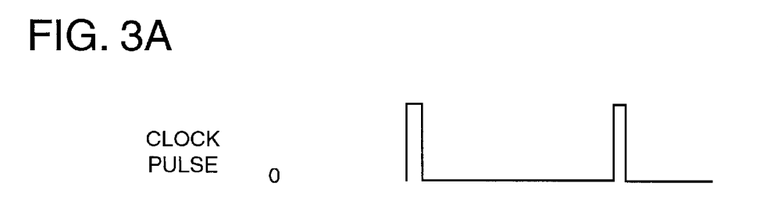
FIGS. 3A–3E are waveform diagrams of signals which are available from a typical pulse width modulator.
Figure 3B:
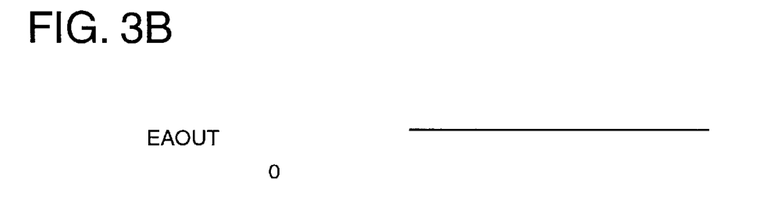
Figure 3C:
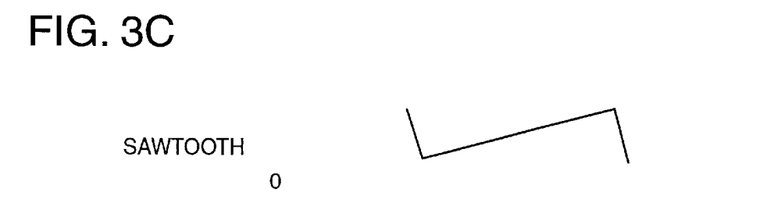
Figure 3D:
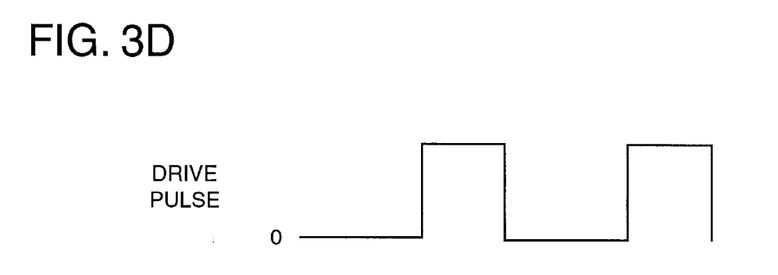

The drive pulse of FIG. 2A which is supplied by drive pulse circuit 12 for the case where there are passive diodes 26 and 28 or where the passive diodes 26 and 28 are replaced by MOSFETs, is commonly provided by a pulse width modulator (PWM) integrated circuit, which often has other voltage signal outputs that have fixed time relationships to the leading edge of the drive pulse. FIGS. 3A–3E show the signals of interest which are available from a typical pulse width modulator. Specifically, as shown in FIG. 3A, there is a clock pulse which is a narrow pulse produced by the internal oscillator in the integrated circuit and used to control timing of the logic within the circuit. The falling edge of this clock pulse triggers the rising edge of the drive pulse shown in FIG. 3D, and is coincident with the minimum value of a signal called the sawtooth waveform which is illustrated in FIG. 3C. Also available from the typical modulator chip is the output voltage from the error amplifier EAOUT, shown in FIG. 3B as a constant voltage. The time when this voltage is equal to the rising slope of the sawtooth waveform of FIG. 3C determines the time when the drive pulse falls to zero volts. Since the maximum value of EAOUT is restricted to a voltage slightly lower than the peak value of the sawtooth, the drive pulse is always completed before the maximum value of the sawtooth is reached, and therefore, before the start of the next clock pulse.

Figure 8:
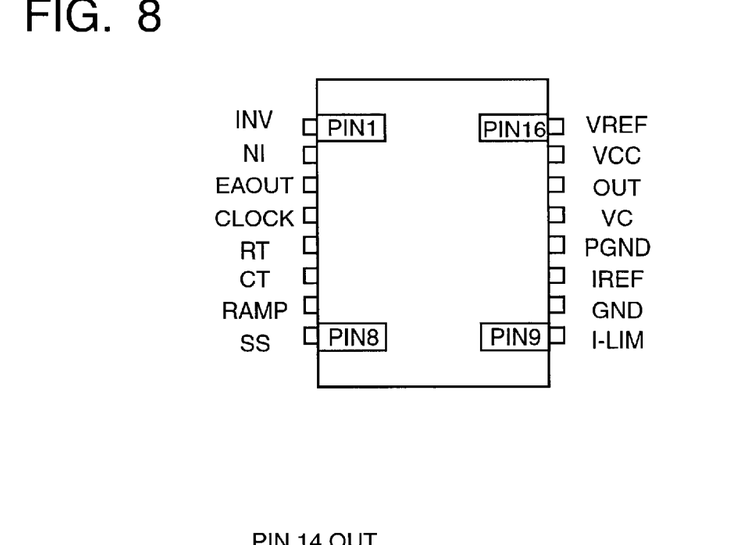
FIG. 8 is a diagram of a commercially available integrated circuit that can be used for the drive pulse circuit.
Figure 9A:
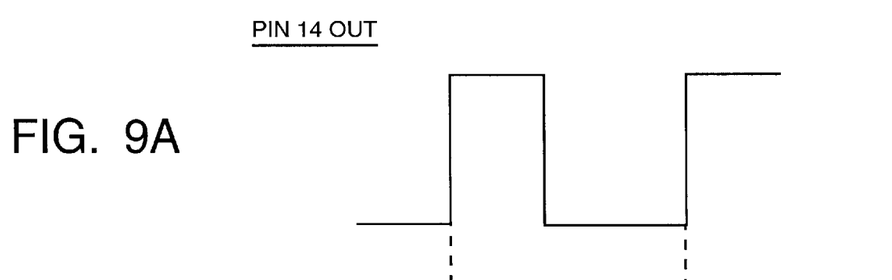
FIGS. 9A–9C are waveform diagrams from different pins of the integrated circuit of FIG. 8.
Figure 9B:
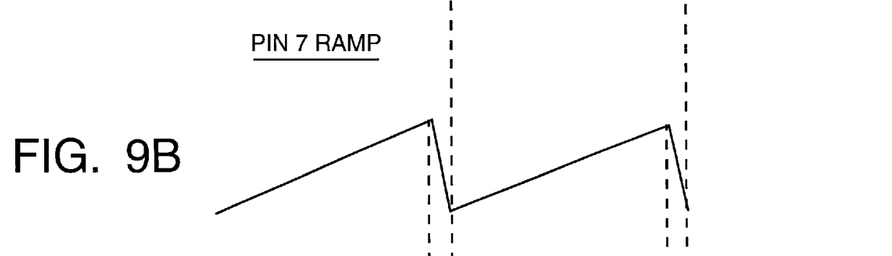
Figure 9C:
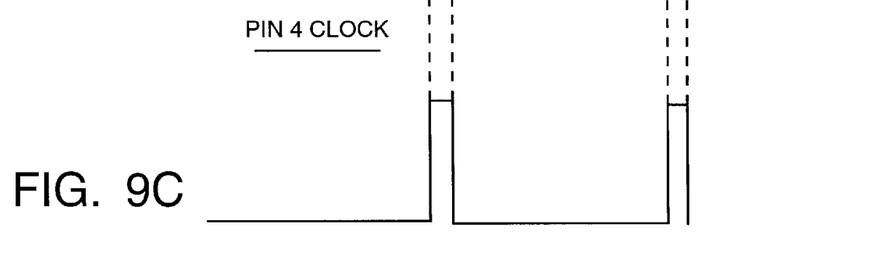

Any suitable circuit can be used for drive pulse circuit 12. For example, a suitable circuit is the commercially available integrated circuit UC 3823A, as shown in FIG. 8, which is a high speed PWM controller manufactured by Unitrode Corporation of Merrimack, N.H., a subsidiary of Texas Instruments. Attention is drawn to the outputs from pins 14 (OUT), 7 (RAMP) and 4 (CLOCK), as shown in FIG. 9, with the output from pin 4 corresponding to the clock pulse in FIG. 3A. Thus, this circuit provides a synchronization pulse output which is suitable for use with the present invention.

Figure 10:
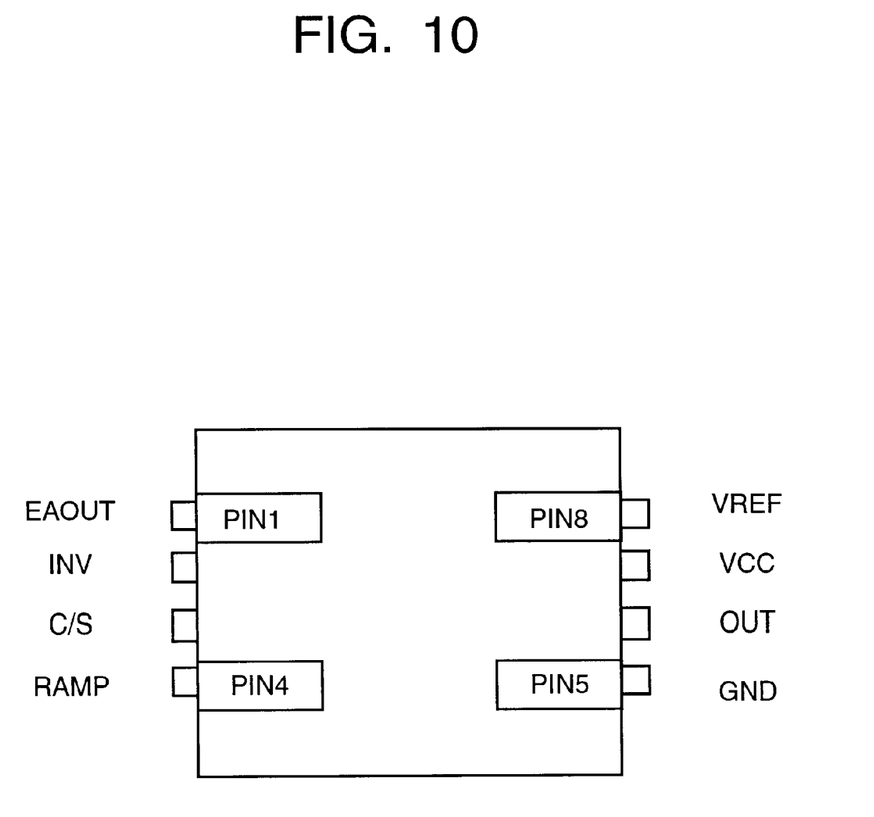
FIG. 10 is a diagram of another commercially available integrated circuit that can be used for the drive pulse circuit.
Figure 11A:
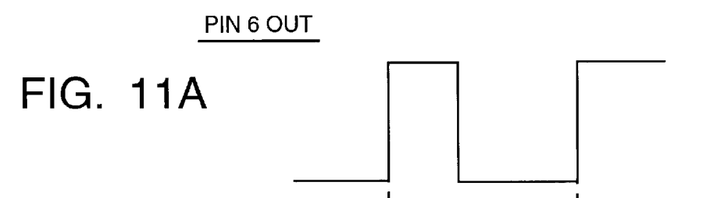
FIGS. 11A and 11B are waveform diagrams from different pins of the integrated circuit of FIG. 10.
Figure 11B:
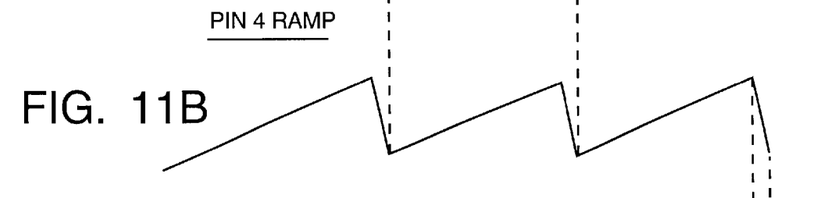

Another suitable circuit is the commercially available integrated circuit UC 3842A, as shown in FIG. 10, which is a current mode PWM controller manufactured by Unitrode Corporation of Merrimack, N.H., a subsidiary of Texas Instruments. This is a less expensive, smaller and more popular power supply integrated circuit. Attention is drawn to the outputs from pins 6 (OUT) and 4 (RAMP), as shown in FIG. 11. This circuit does not provide the synchronous output required by the present invention. Accordingly, an additional circuit is required to provide this output signal.

Figure 12:
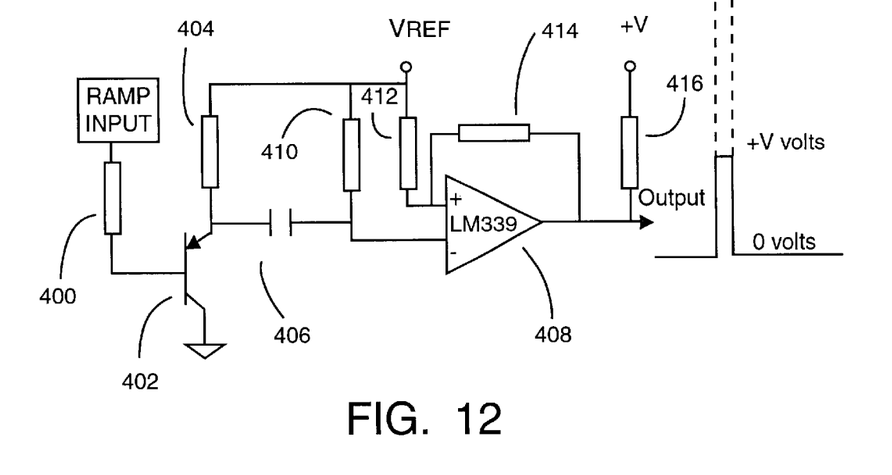
FIG. 12 is a circuit wiring diagram of an additional circuit for use with the integrated circuit of FIG. 10 to produce the synchronous output pulse.

Specifically, as shown in FIG. 12, the ramp output from pin 4 of the integrated circuit of FIG. 3 is supplied through a resistor 400 to the base of a transistor 402, the output path of which is connected between ground and a resistor 404. The emitter of transistor 402 is connected to a capacitor 406, the opposite end of which is connected to the inverting input of a comparator 408. Resistors 400 and 404 and transistor 402 perform the function of a buffer current amplifier between the ramp output at pin 4 and capacitor 406, so that the voltage ramp appears at the junction of transistor 402, resistor 404 and capacitor 406. This is because the ramp waveform could be distorted if capacitor 406 is directly driven by the ramp signal from pin 4.

The opposite end of capacitor 406 is also connected to one end of a resistor 410, the opposite end of which is connected to the opposite end of resistor 404. Capacitor 406 and resistor 410 together function as a differentiator, which provides an output voltage proportional to the rate of change of the input voltage, the output of which is referenced to the positive supply voltage $+V_{REF}$ through resistor 410.

The initial part of the ramp signal is a positive rising edge and this produces a constant voltage at the junction of capacitor 406 and resistor 410, which is higher than the voltage $+V_{REF}$, and which is also connected to the inverting input of comparator 408. The non-inverting input of comparator 408 is connected with the positive voltage $+V_{REF}$ through a resistor 412, and comparator 408 also includes a feedback resistor 414 with the non-inverting input thereof.

Comparator 408 has two possible stable outputs, namely, 0 volts or +V volts pulled up through a resistor 416 connected between the output thereof and the positive voltage +V. Positive feedback resistor 414 ensures a quick transition between these two states. If the inverting input of comparator 408 is more positive than the non-inverting input thereof, the output voltage is 0 volts. However, if the inverting input of comparator 408 is more negative than the non-inverting input, the output of comparator 408 is +V volts. Since the initial positive slope of the ramp causes the inverting input to be more positive than $+V_{REF}$ volts and the non-inverting input is tied to $+V_{REF}$ through resistor 412, the output of comparator 408 is at 0 volts during the initial rising ramp. When the ramp slope changes from a rising slope to a falling slope, the voltage at the function of capacitor 406 and resistor 410, and therefore at the inverting input of comparator 408, abruptly changes to a voltage value less than $+V_{REF}$ volts. This results in the output of comparator 408 rising to +V volts and staying at this value throughout the falling slope of the ramp. The output of this circuit, namely, 0 volts during the rising slope of the ramp and +V volts during the falling slope, is therefore almost identical to the clock pulse provided by integrated circuit UC 3823A of FIG. 8.

Figure 4:
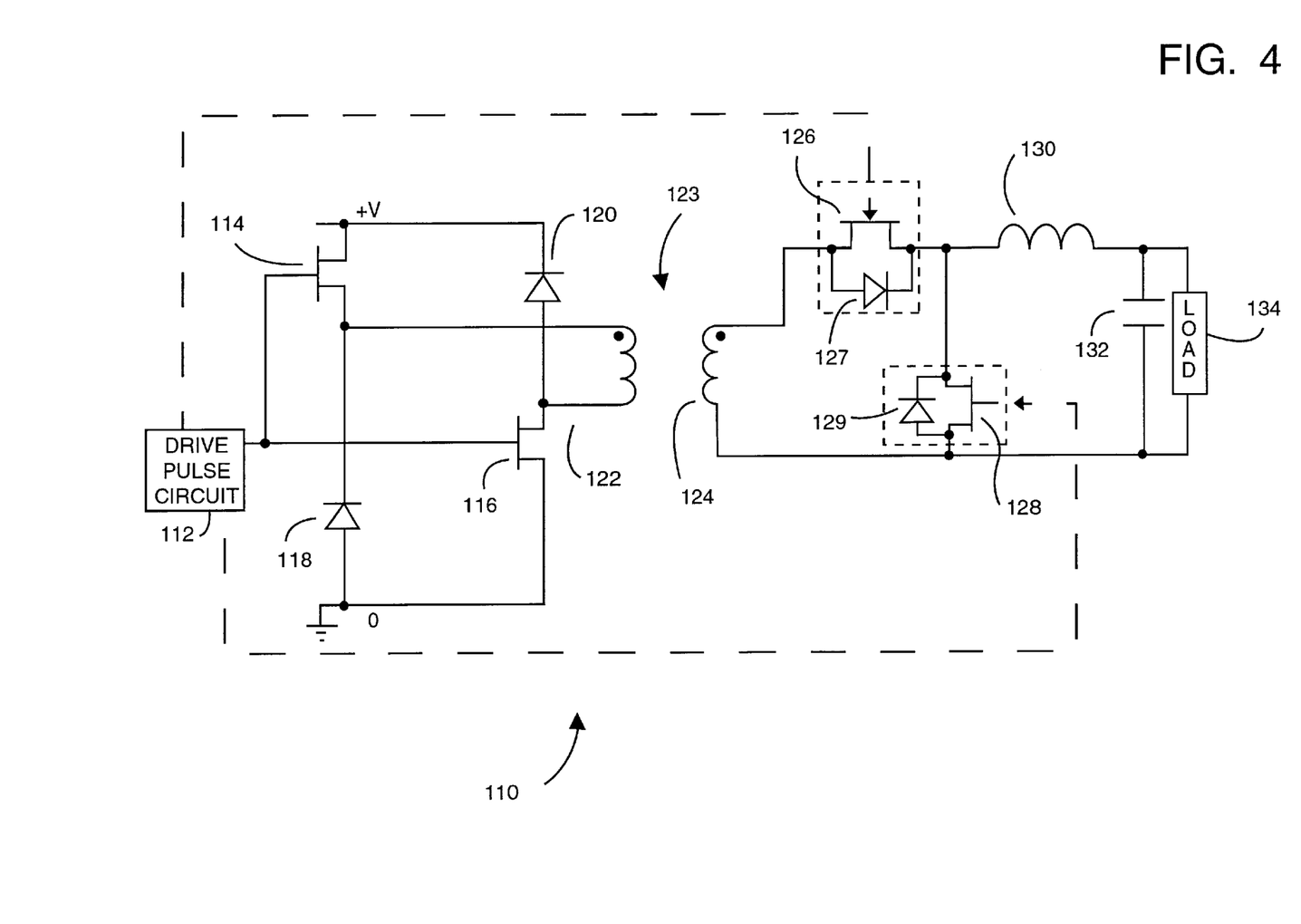
FIG. 4 is a circuit wiring diagram of a switch mode power supply according to a first embodiment of the present invention.

Referring now to FIG. 4, a switch mode power supply circuit 110 according to a first embodiment of the present invention will now be described, in which elements common to those in the prior art circuit of FIG. 1 are identified by the same reference numerals but augmented by 100.

Specifically, at the input side, drive pulses, and more particularly, pulse width modulated (PWM) pulses are supplied from a drive pulse circuit 112 to the gate inputs of MOSFETs 114 and 116. MOSFET 114 has its output circuit connected in series with a first input diode 118, and more particularly, is connected with the cathode of diode 118, with the series circuit of diode 118 and the output circuit of MOSFET 114 connected between a positive voltage +V and ground, and the anode of diode 118 connected to ground. The output circuit of MOSFET 116 is connected in series with a second input diode 120, and more particularly, to the anode thereof, with this series circuit also connected between positive voltage +V and ground, and the cathode of diode 120 connected to positive voltage +V. One end of a primary winding 122 of a transformer 123 is connected to the junction of MOSFET 114 with diode 118, and the other end of primary winding 122 is connected to the junction of MOSFET 116 and diode 120.

At the output side, a secondary winding 124 of transformer 123 is positioned in close proximity to primary winding 122 and is driven thereby. One end of secondary winding 124 is connected to the output path of a first MOSFET 126 and the other end of secondary winding 124 is connected to the output path of a second MOSFET 128, with the output paths of first and second MOSFETs 126 and 128 being connected together and also being connected to one end of a choke coil or inductor 130. Diodes 127 and 129 are connected in parallel across the output paths of MOSFETs 126 and 128, respectively. The opposite end of choke coil 130 is connected to one end of a capacitor 132, and the opposite end of capacitor 132 is connected with the lower end of secondary winding 124. A load 134 is placed in parallel connection with capacitor 132.

However, it is now necessary to control the turning on and off of MOSFETs 126 and 128 to ensure that they conduct at the correct times for maximum efficiency. In this regard, MOSFET 126 must conduct only when the drive pulse from drive pulse circuit 112 is at +V1 volts and MOSFETs 114 and 116 are closed, so that the gate of MOSFET 126 can be driven with a voltage which follows the drive pulse exactly. The more complex problem, however, is how to turn MOSFET 128 on and off at exactly the right time, without providing long null time periods in which both MOSFETs 126 and 128 are turned off, which results in great inefficiency.

Figure 3E:
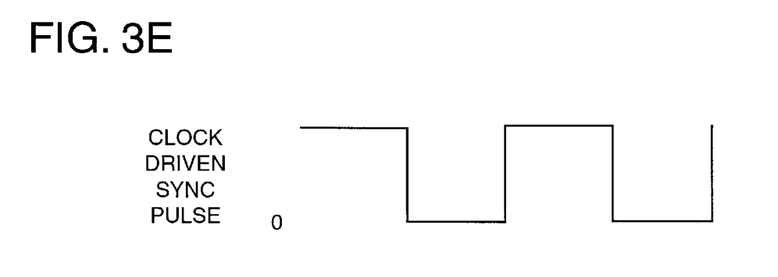

This is accomplished by supplying a clock driven or reset synchronizing pulse, as shown in FIG. 3E, to the gate of MOSFET 128. The generation and supply of the clock driven synchronizing pulse and its application to rectifier synchronization is a key aspect to the present invention.

Specifically, MOSFET 128 should be turned on as soon as possible after MOSFET 126 turns off, in order to provide the greatest efficiency in the circuit. This is accomplished with the clock reset synchronizing pulse. The rising edge of the clock reset synchronizing pulse of FIG. 3E is derived from the falling edge of the drive pulse of FIG. 3D. The problem is how to derive the falling edge of the drive pulse to turn off MOSFET 128. If MOSFET 128 turns off before MOSFET 126 turns on, current will flow through diode 129 and dissipate power. This is a relatively minor problem if both MOSFETs are off for only a short time. If MOSFET 128 does not turn off until after MOSFET 126 turns on, the output current which should be flowing through the load will be bypassed through MOSFET 128 and waste a large amount of power. This would be a major problem and MOSFETS 126 and 128 should never be both on at the same time. The ideal situation is for MOSFET 128 to turn off immediately before MOSFET 126 turns on. As discussed above, several complex methods have been suggested to achieve this result. However, this generally requires the use of the output from the secondary winding along with delay circuitry.

In accordance with the present invention, MOSFET 128 is turned off with the rising edge of the clock pulse of FIG. 3A, which is the signal provided by drive pulse circuit 112 at the input before primary winding 122, rather than using the output after secondary winding 124. This is because the rising edge of the clock pulse of FIG. 3A always precedes the rising edge of the drive pulse of FIG. 3D by the width of the clock pulse, which is only a few hundred nanoseconds. Since the falling edge of the clock pulse of FIG. 3A coincides with the turning on of MOSFET 126, it is ensured that MOSFET 128 is turned off immediately prior thereto by using the rising edge of the clock pulse of FIG. 3A. Thus, MOSFET 128 turns off immediately before MOSFET 126 turns on, and the time for which both MOSFETS 126 and 128 are off is negligible. In effect, MOSFETs 126 and 128 will be alternately on and for approximately a total time of 98%.

Thus, the pulse width modulator which supplies the drive pulses also controls the turning on and off of MOSFETs 126 and 128. There is thus no need for any complicated drive circuitry including delay circuits as in the prior art. Also, since no delay circuits are used, the control of MOSFETs 126 and 128 is not frequency dependent at all. Also, there is a substantial decrease in the power drop as compared with the diodes of FIG. 1. For example, there might be a 15.6 watt power drop across diodes 26 and 28 of FIG. 1, with only a 3.3 watt drop across MOSFETs 126 and 128 of FIG. 4, resulting in a greater than 10 percent increase in efficiency thereover.

Further, by increasing the switch mode power supply efficiency, the present invention enables power supplies to be smaller and lighter, and to run at a lower temperature and be more reliable.

Figure 5:
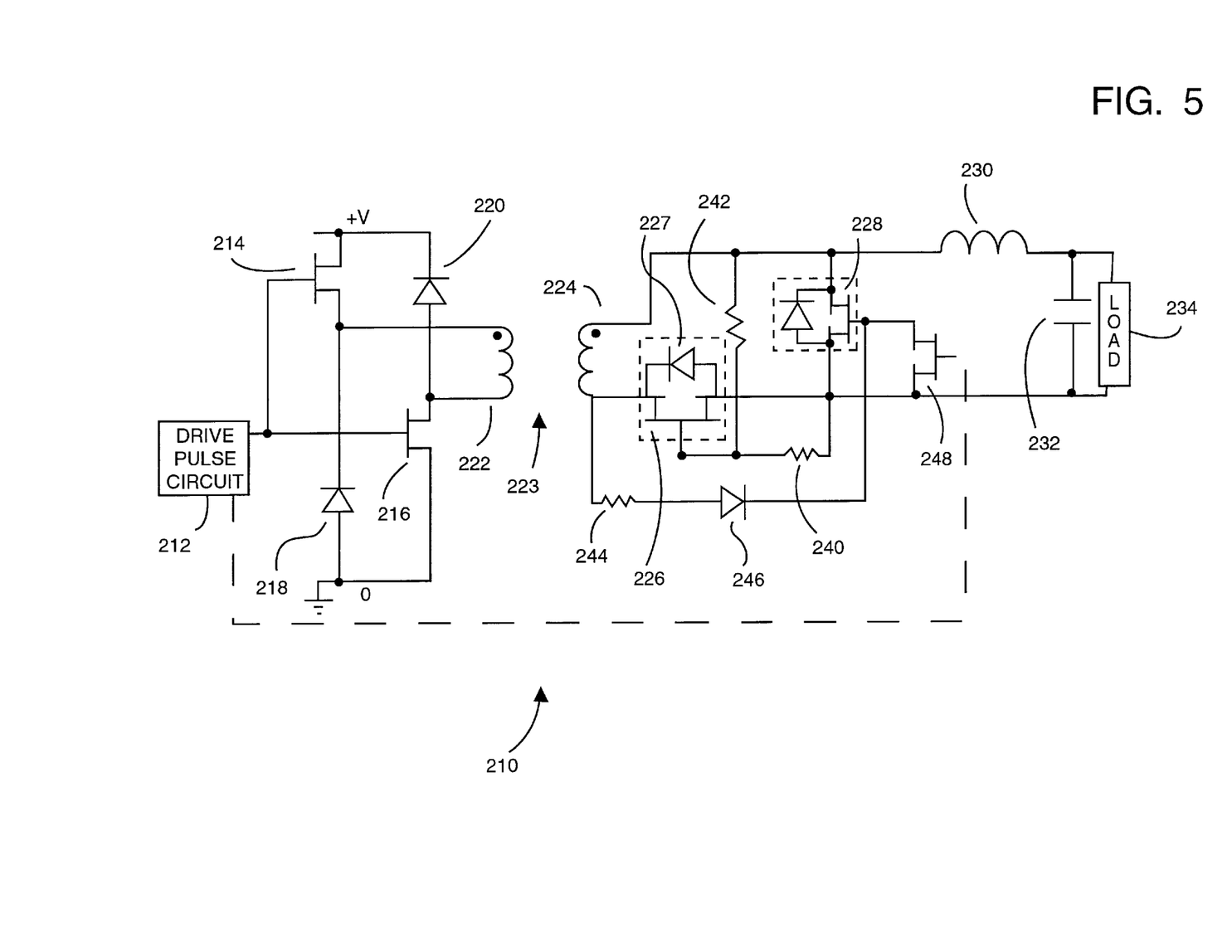
FIG. 5 is a circuit wiring diagram of a switch mode power supply according to a second embodiment of the present invention.

Referring now to FIG. 5, a switch mode power supply circuit 210 according to a second embodiment of the present invention will now be described, in which elements common to those in the switch mode power supply circuit of FIG. 4 are identified by the same reference numerals but augmented by a further 100. In this second embodiment, the rising edge of the clock pulse of FIG. 3A is used to synchronize MOSFET 228 directly without creating an intermediate signal.

Specifically, the input side of switch mode power supply circuit 210 is identical with the input side of switch mode power supply circuit 110 of FIG. 4, with drive pulse circuit 212, MOSFETs 214 and 216, input diodes 218 and 220, and primary winding 222 of transformer 223 corresponding identically to drive pulse circuit 112, MOSFETs 114 and 116, input diodes 118 and 120, and primary winding 122 of transformer 123, respectively.

At the output side, a secondary winding 224 of transformer 223 is positioned in close proximity to primary winding 222 and is driven thereby. One end of secondary winding 224 is connected to the output path of a first MOSFET 226 and the other end of secondary winding 224 is connected to the output path of a second MOSFET 228, with the output paths of first and second MOSFETs 226 and 228 being connected together and also being connected to one end of a capacitor 232. Diodes 227 and 229 are connected in parallel across the output paths of MOSFETs 226 and 228, respectively. The opposite end of the output path of second MOSFET 228, which is connected with the other end of secondary winding 224, is connected to one end of a choke coil or inductor 230, the opposite end of which is connected to the opposite end of capacitor 232. A load 234 is placed in parallel connection with capacitor 232.

However, it is now necessary to control the turning on and off of MOSFETs 226 and 228 to ensure that they conduct at the correct times for maximum efficiency. In this regard, MOSFETs 226 and 228 can be driven almost entirely from the secondary side. MOSFET 226 must be turned on when the upper (dot) end of secondary winding 224 is positive and must be turned off when the upper (dot) end of secondary winding 224 goes negative, which coincides with the drive pulse signal of FIG. 3D. Thus, MOSFET 226 can be driven directly from secondary winding 224 through a resistor 240 connected between one end of secondary winding 224 and the gate of MOSFET 226. The gate of MOSFET 226 is also connected through a resistor 240 to the junction of the output paths of MOSFETs 226 and 228.

However, MOSFET 228 must be turned on when the upper (dot) end of secondary winding 224 goes negative and the lower end goes positive. In this regard, MOSFET 228 is driven from the lower end of secondary winding 224 through a series circuit of a resistor 244 and a diode 246, connected to the gate of MOSFET 228. Resistor 244 and diode 246 effectively act as a one-shot, as will be understood from the discussion hereinafter. However, MOSFET 228 must be turned off just before MOSFET 226 turns on. In order to accomplish this, a further MOSFET 248 has its output path connected between the output path of MOSFET 226 and the gate of MOSFET 228. Thus, when MOSFET 248 is turned on, MOSFET 228 turns off. In order to control the turning on and off of MOSFET 248, the gate of MOSFET 248 is driven by the rising edge of the clock pulse of FIG. 3A, which turns on MOSFET 248, and thereby turns off MOSFET 228, several hundred nanoseconds before the falling edge of the clock pulse when MOSFET 226 turns on. In this way, MOSFET 228 is optimally synchronized by the rising edge of the clock pulse of FIG. 3A. Thus, like the first embodiment, the clock pulse of FIG. 3A is used to control the turning off of one MOSFET 128, 228 before the turning on of the other MOSFET 126, 226.

Thus, although it is known to use MOSFETs in a switching arrangement similar to the present invention of FIG. 5, this occurs without diode 246. Typically, the switching by secondary winding 224 turns MOSFETs 226 and 228 off prematurely so that each is only on for approximately 30% of the time. This means that there is a 40% time during which no power is supplied, and which results in great inefficiency.

With the present invention of FIG. 5, MOSFET 226 is turned on for 30% of the time as in the prior art. However, MOSFET 228 is turned on by the signal through resistor 244 and diode 246 which charge the gate thereof. Once the gate of MOSFET 228 is charged, MOSFET 228 remains on. Even when the input to diode 246 is negative during the negative cycle, diode 246 is turned off, but the input gate of MOSFET 228 is still charged, so that MOSFET 228 remains on and would remain on 100 percent of the time. Without diode 246, the input gate is dragged down and thereby turned off. In such case, MOSFET 228 would only be on for approximately 30% of the time.

Therefore, it is necessary to shut off MOSFET 228, and in this regard, the clock pulse shown in FIG. 3A is used again at the input gate of the further switching MOSFET 248. Specifically, the gate of MOSFET 248 is driven by the rising edge of the clock pulse of FIG. 3A, which will turn MOSFET 248 on. This results in the input to MOSFET 228 being pulled down so as to turn MOSFET 228 off several hundred nanoseconds before the falling edge of the clock pulse when MOSFET 226 turns on. In this way, MOSFET 228 is turned off immediately before MOSFET 226 is turned on. In other words, diode 246 provides that MOSFET 228 is turned on but prevents MOSFET 228 from being turned off during the negative cycle, and this is the reason for providing MOSFET 248 which is driven by the clock pulse of the pulse width modulator in order to control the time during which MOSFET 228 is turned on. With this arrangement, if MOSFET 226 is turned on approximately 30% of the time as typical in the prior art, then MOSFET 228 is automatically turned on approximately 68% of the time to provide a high power efficiency, without any circuit modification or time delay circuits.

Figure 6:
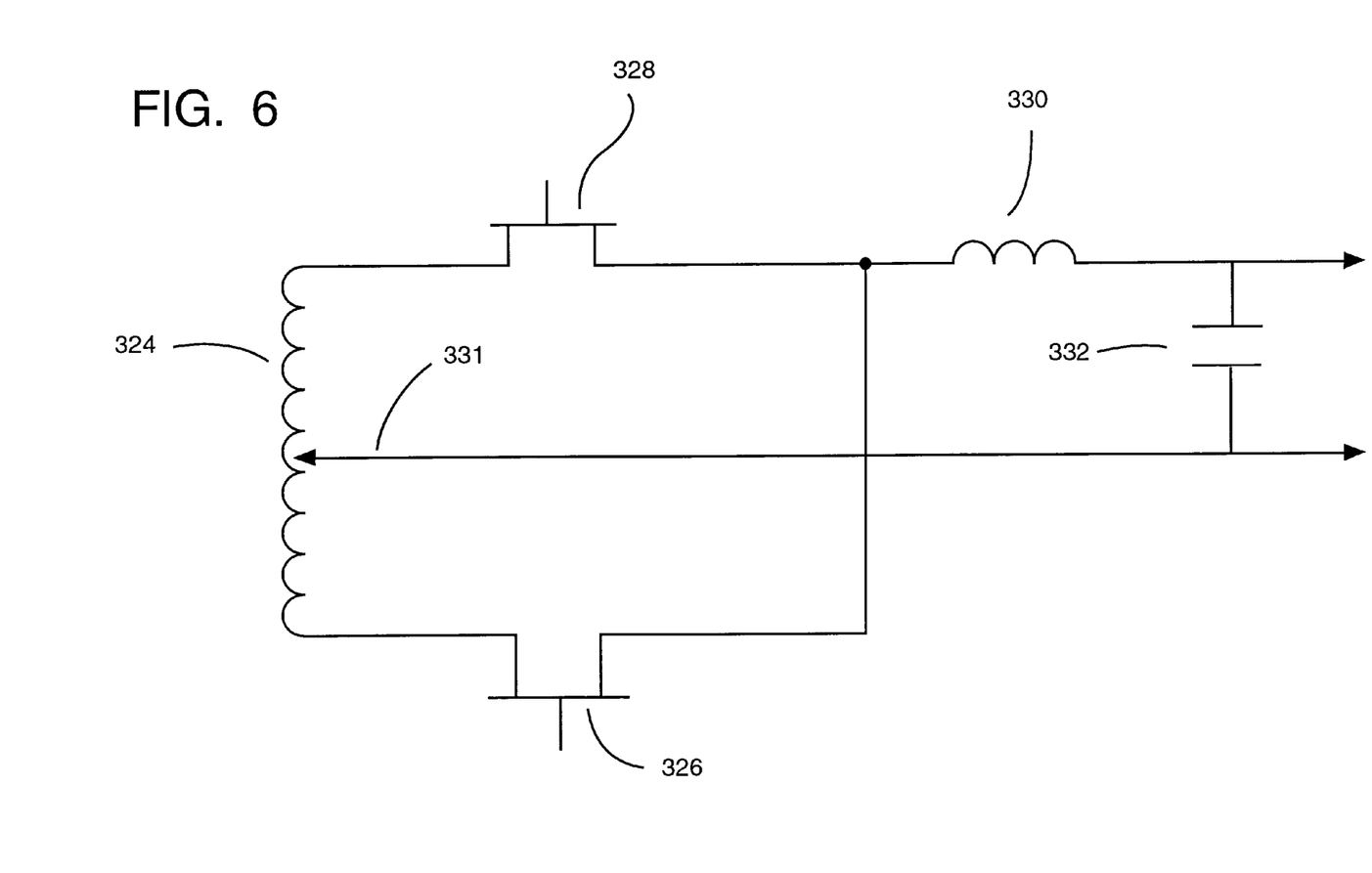
FIG. 6 is a circuit wiring diagram of the output stage of a push-pull type power supply circuit with which the present invention can be used, according to a third embodiment of the present invention.

Both the first embodiment of FIG. 4 and the second embodiment of FIG. 6 are dependent upon the clock pulse, and in the case of the first embodiment, the drive pulse as well, of the pulse width modulator at the input side for controlling the on and off times of the MOSFETs, and this is essential to the present invention.

It will be appreciated that the above invention of clock reset synchronization is not only applicable to power supplies of the aforementioned types, but has wider application to the output stages of different types of power supplies. Thus, the present invention can be used with any front-end topology driven by a pulse width modulator.

The present invention can therefore be used with other types of power supplies, such as push-pull, half bridge or the like, using the basic concept of the present invention. For example, the output stage of a push-pull type power supply circuit 310 with which the present invention can be used, is shown in FIG. 6. In this regard, the secondary winding 324 of a transformer has one end connected to the output path of a first MOSFET 326 and the opposite end connected to the output path of a second MOSFET 328. The opposite ends of the output paths of MOSFETs 326 and 328 are commonly connected to one end of a choke coil or inductor 330. The opposite end of inductor 330 is connected to one end of a capacitor 332, and the opposite end of capacitor 332 is connected to a center tap 331 of secondary winding 324.

Figure 7:
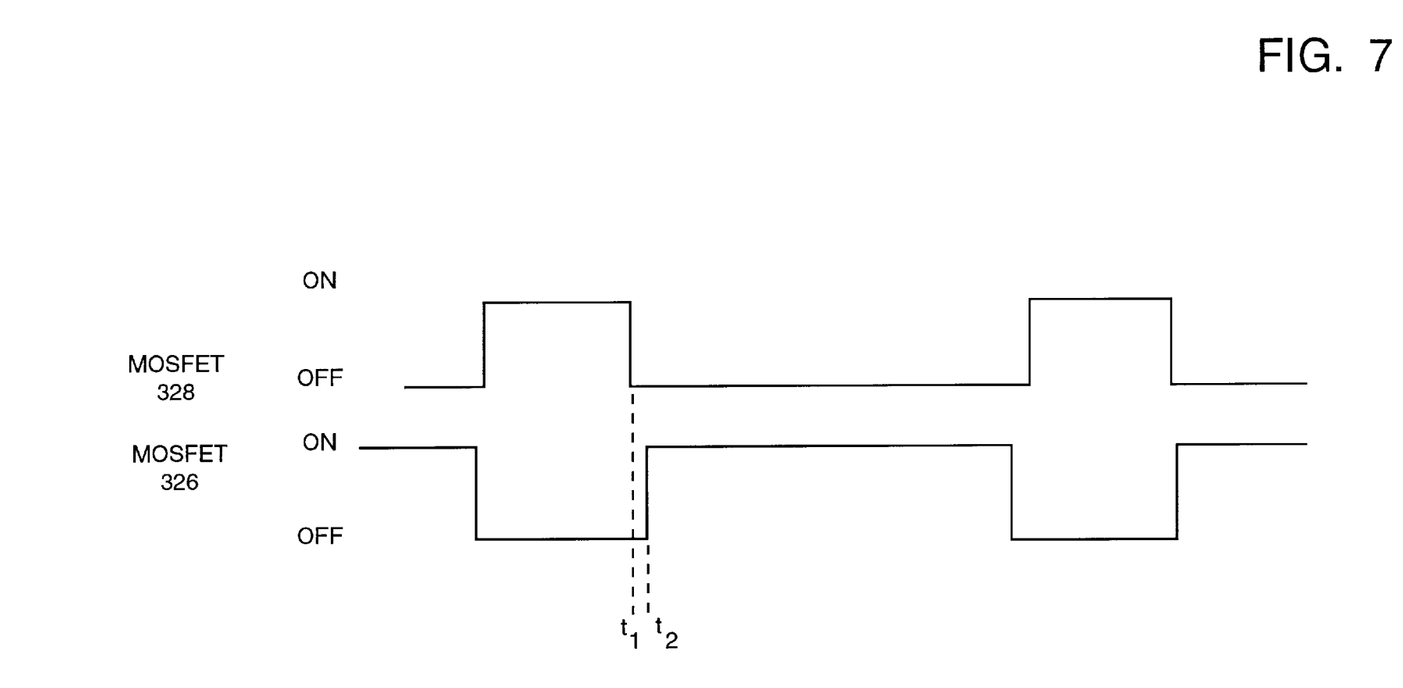
FIG. 7 provides timing charts showing the on and off times of the MOSFETs of the circuit of FIG. 6.

Again, the rising and falling edges of the clock pulse of FIG. 3A are used to control MOSFETS 326 and 328, and the timing charts are shown in FIG. 7 for the on and off times of MOSFETs 326 and 328. Thus, as shown in FIG. 7, MOSFET 328 turns off at time t1 immediately prior to MOSFET 326 turning on at time t2.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A power supply circuit comprising:
   an input stage including:
   a primary winding of a transformer,
   a drive pulse circuit for producing a clock pulse and a drive pulse, and
   an input control circuit connected between the drive pulse circuit and the primary winding for driving the primary winding in accordance with the drive pulse; and
   an output stage including:
   a secondary winding of said transformer in close proximity to said primary winding,
   a first transistor having an input, and an output path connected with one end of said secondary winding;
   a second transistor having an input, and an output path connected with another end of said secondary winding,
   at least one of said first and second transistors being connected with said drive pulse circuit and controlled to turn off by said clock pulse from said drive pulse circuit immediately before the other one of said transistors is turned on;
   an inductor having one end connected to the output path of one of said first and second transistors, and
   a capacitive circuit connected to an opposite end of said inductor.

2. A power supply circuit according to claim 1, wherein said transistors are field effect transistors.

3. A power supply circuit according to claim 1, wherein said drive pulse is applied to the input of said first transistor for turning said first transistor on and off, said drive pulse is applied to the input of said second transistor for turning said second transistor on, and said clock pulse is applied to the input of said second transistor for turning said second transistor off.

4. A power supply circuit according to claim 1, wherein the output path of said first transistor is connected between said one end of said secondary winding and said one end of said inductor, and the output path of said second transistor is connected between said other end of said secondary winding and said one end of said inductor.

5. A power supply circuit according to claim 4, wherein said drive pulse is applied to the input of said first transistor for turning said first transistor on and off, said drive pulse is applied to the input of said second transistor for turning said second transistor on, and said clock pulse is applied to the input of said second transistor for turning said second transistor off.

6. A power supply circuit according to claim 1, further comprising a load connected in parallel with said capacitive circuit.

7. A power supply circuit according to claim 1, further comprising a diode connected across the output path of each of said transistors.

8. A power supply circuit according to claim 1, wherein:
   the output path of said first transistor is connected between said one end of said secondary winding and said capacitive circuit,
   the input of said first transistor is connected through a resistive circuit to said one end of said secondary winding,
   the output path of said second transistor is connected between said other end of said secondary winding and said capacitive circuit, the input of said second transistor is connected through a unidirectional circuit to said one end of said secondary winding, and a switch circuit connected to the input of said second transistor to turn said second transistor off in response to said clock signal immediately before said first transistor turns on.

9. A power supply circuit according to claim 8, wherein said switch circuit includes a third transistor having an output path connected between the output path of said first transistor and the input of said second transistor, and an input supplied with the clock signal from said drive pulse circuit.

10. A power supply circuit according to claim 1, wherein:

the output path of said first transistor is connected between said one end of said secondary winding and said one end of said inductor, said second transistor is connected between the other end of said secondary winding and said one end of said inductor, and said capacitive circuit is connected between the other end of said inductor and a tap of said secondary winding.

11. A power supply circuit comprising:

an input stage including:
 a primary winding of a transformer,
 a drive pulse circuit for producing a clock pulse and a drive pulse, and
 an input control circuit connected between the drive pulse circuit and the primary winding for driving the primary winding in accordance with the drive pulse; and an output stage including:
 a secondary winding of said transformer in close proximity to said primary winding,
 a first transistor having:
  an input connected with said drive pulse circuit and supplied with said drive pulse for turning said first transistor on and off, and
  an output path connected with one end of said secondary winding;
 a second transistor having:
  an input connected with said drive pulse circuit and supplied with said clock signal for turning off said second transistor immediately before said first transistor is turned on, and
  an output path connected with another end of said secondary winding and with the output path of said first transistor,
 an inductor having one end connected to the output paths of said first and second transistors, and
 a capacitive circuit connected between an opposite end of said inductor and said another end of said secondary winding.

12. A power supply circuit according to claim 11, wherein said drive pulse is applied to the input of said first transistor for turning said first transistor on and off, said drive pulse is applied to the input of said second transistor for turning said second transistor on, and said clock pulse is applied to the input of said second transistor for turning said second transistor off.

13. A power supply circuit according to claim 11, further comprising a load connected in parallel with said capacitive circuit.

14. A power supply circuit according to claim 11, further comprising a diode connected across the output path of each of said transistors.

15. A power supply circuit comprising:

an input stage including:
 a primary winding of a transformer,
 a drive pulse circuit for producing a clock pulse and a drive pulse, and
 an input control circuit connected between the drive pulse circuit and the primary winding for driving the primary winding in accordance with the drive pulse; and an output stage including:
 a secondary winding of said transformer in close proximity to said primary winding,
 a first transistor having:
  an input connected with one end of said secondary winding, and
  an output path connected with said one end of said secondary winding;
 a second transistor having:
  an input connected with said one end of said secondary winding through a unidirectional device, and
  an output path connected between the other end of said secondary winding and the output path of said first transistor;
 a third transistor having an output path connected between the input of the second transistor and the output path of the first transistor, and an input supplied with the clock signal from the drive pulse circuit to turn said second transistor off immediately before said first transistor turns on;
 an inductor having one end connected to the other end of said secondary winding; and
 a capacitive circuit connected between an opposite end of said inductor and the output path of said first transistor.

16. A power supply circuit according to claim 15, wherein said unidirectional device includes a diode.

17. A power supply circuit according to claim 15, further comprising a load connected in parallel with said capacitive circuit.

18. A power supply circuit according to claim 15, further comprising a diode connected across the output path of each of said transistors.

* * * * *